US008362451B2

(12) United States Patent
Yoon et al.

(10) Patent No.: US 8,362,451 B2

(45) Date of Patent: Jan. 29, 2013

(54) HAND CARRY TYPE PORTABLE CURING APPARATUS USING LONG-ARC UV LAMP

(75) Inventors: Joo-Young Yoon, Busan (KR); Young-Il Youn, Ulsan (KR); Chang-Hwan Kim, Ulsan (KR); Ho-Keun Yoon, Daegu (KR)

(73) Assignee: Unilam Co., Ltd. (KR)

( * ) Notice: Subject to any disclaimer, the term of this patent is extended or adjusted under 35 U.S.C. 154(b) by 24 days.

(21) Appl. No.: 13/031,481

(22) Filed: Feb. 21, 2011

(65) Prior Publication Data

US 2012/0161039 A1 Jun. 28, 2012

(30) Foreign Application Priority Data

Dec. 23, 2010 (KR) ........................ 10-2010-0133104

(51) Int. Cl.

*F21V 29/00* (2006.01)

*G01N 21/33* (2006.01)

(52) U.S. Cl. ................ 250/504 H; 250/504 R; 250/365; 422/24; 362/109; 362/230; 362/373; 324/414

(58) Field of Classification Search .............. 250/504 H, 250/504 R, 365; 422/24; 362/109, 230, 362/264, 373; 324/414

See application file for complete search history.

(56) References Cited

U.S. PATENT DOCUMENTS

| | | | | |
|---|---|---|---|---|
| 7,301,346 | B2 * | 11/2007 | Annighoefer et al. | 324/414 |
| 7,731,379 | B2 * | 6/2010 | Wakalopulos | 362/109 |
| 2009/0314966 | A1 * | 12/2009 | Garcia | 250/504 H |

FOREIGN PATENT DOCUMENTS

KR 10-2007-0078836 A 8/2007

* cited by examiner

*Primary Examiner* — Nikita Wells

(74) *Attorney, Agent, or Firm* — Park & Associates IP Law, P.C.

(57) ABSTRACT

A hand carry type portable curing apparatus using a long-arc UltraViolet (UV) lamp for concentrating the external air on the long-arc UV lamp and enhancing cooling efficiency by disposing a fan at a tilt angle and in addition installing a means for forcibly inducing a flow of air inside is provided. The apparatus includes a housing having an accepting part therein, the long-arc UV lamp installed in the accepting part of the housing, and a fan installed in the housing and cooling the long-arc UV lamp. The fan is installed on the slant to tilt toward the front in a front surface of the housing.

3 Claims, 4 Drawing Sheets

HAND CARRY TYPE PORTABLE CURING APPARATUS USING LONG-ARC UV LAMP

REFERENCE TO RELATED APPLICATIONS

This application claims the priority benefit of Korean Patent Application No. 10-2010-133104 filed on Dec. 23, 2010, the entire contents of which are incorporated herein by reference.

FIELD OF THE INVENTION

The present invention relates to a portable exposure and curing system using a long-arc UltraViolet (UV) lamp. More particularly, the present invention relates to a hand carry type portable curing apparatus using a long-arc UV lamp for, by disposing a fan at a tilt angle and in addition installing a means for forcibly inducing a flow of air inside, concentrating the external air on the long-arc UV lamp and enhancing cooling efficiency.

BACKGROUND OF THE INVENTION

Today, environmental-friendly material (e.g., plastics, metals, etc.) treatment technologies are under development. And, a portable UV treatment (i.e., UV curing, drying, coating, and printing) apparatus enabling free movement and worker's own carrying when coating, drying, and printing curved surfaces of building accessory materials (a bathtub, a marble bottom and wall body, etc.), industrial materials (e.g., car plastic parts, car exterior cladding frames), etc. capable of meeting the above consumer's demand is under development and deployment as the recent consumer's demand changes to environmental-friendly materials occupying a small installation space and also capable of providing material treatment (curing, drying, coating, printing, etc.) enabling easy movement and worker's own carrying.

For specific local or curved part surfaces of the above products, materials need the curing, coating, drying, and printing apparatus. In detail, the apparatus irradiates UV into a coated or printed product with the listed materials using a cylinder type oval condenser mirror making use of a high pressure mercury or metal long-arc lamp that is a high pressure UV lamp or a metal and mercury lamp, and irradiates UV (particularly, 'i' rays of 365 nm) at an illumination necessary for UV photo reaction and executes operations such as UV curing, drying, printing, and coating. Generally, a conventional apparatus using a long-arc lamp is of a fixed type, and another kind is a spot curing apparatus using a short-arc lamp for irradiating UV and curing an area of 3 to 10 mm.

However, in the above conventional fixed and portable UV curing apparatus using the long-arc lamp, a cooling structure is of a type in which a fan (i.e., a cooling unit) is installed in a right-angled direction or vertical direction of the long-arc lamp. Because of this, a high pressure long-arc lamp has a short lifetime and consumes a high replacement cost. Also, in case of a high pressure metal UV lamp or a high pressure mercury lamp, as cooling non-uniformity occurs, substances within a high pressure UV lamp (i.e., mercury, and metals for UV radiation) can suffer abnormal convection and thus, can deteriorate the quality of UV curing, drying, coating, and printing. In case of a spot curing UV apparatus using a short-arc lamp, movement is difficult and a fixed type is used. The spot curing UV apparatus is used for a very small area below $10\pi$.

Accordingly, in recent years, a curing work using a long-arc UV lamp is becoming a new alternative.

The present invention presents a UV curing system using the long-arc UV lamp that can be hand carried by a worker.

The UV curing, printing, drying, and coating refers to a scheme of inducing a chemical UV reaction dependent on the addition of a kind of synthetic resin and hardening a product surface. In case of a curing reaction, a chemical component of resin is transformed from monomer to polymer, and a micro hand carry type curing unit is mainly used for the car exterior coating curing and surface curing treatment for a building interior bottom or tile, a bathtub, a marble, etc.

Conventional ink and coating (with water or solvent base) is dried through an evaporation process (i.e., heat curing and heat drying) for eliminating about 40% of a capacity of a coated ink. The UV curing ink and coating includes a photoinitiator that is a special composition sensitive to UV radiation rays. An exposure to UV radiation rays causes a polymer net knot in which ink is crosslinked beginning a rapid reaction, and is transformed from liquid to solidification state. A UV curing (drying, coating, and printing) process is a chemical reaction called a 'photopolymerization', and is a technology of changing monomer into polymer by UV light. UV curing materials are generally composed of monomer, oligomer (prepolymer), photoinitiator, and other additives. If irradiated by UV light, the photoinitiator is excited and, by this excitation energy, monomer (liquid) converts into polymer (solid). This process does not need a solvent. Products are not dried by heat but are cured by UV light. Thus, an energy loss is very small compared to heat drying and heat curing. For this reason, a contribution to the recent green (environmental-friendly production and manufacturing process) energy field is very large.

It is basically different from heat drying, i.e., a method of gasifying a solvent by heat energy and solidifying the solvent.

The prior art provides a substantial matter of a UV curing apparatus including a UV lamp, a reflection mirror surrounding the UV lamp, a lamp unit composed of a lamp house embedding the lamp and the reflection mirror, a rotary shaft installed in the lamp unit, a lamp installation mount embedding the lamp unit, and a handle installed in an end of the rotary shaft, wherein a shaft support means for supporting both-side ends of the rotary shaft is installed in the lamp installation mount, and the rotary shaft is fixed to a side wall of a lamp house to which the UV lamp of the lamp unit is fixed and in addition, is extended outside the shaft support means of the lamp installation mount and on the other hand, a rotation locking unit installed to press and fix the other end of the rotary shaft extending and protruding outside is provided in an outer wall of the lamp installation mount in which the shaft support means is installed.

However, the above prior art needs a cooling means for cooling a UV lamp gradually increasing in temperature during a long-time use process. But, the prior art does not disclose this cooling means and thus, can cause a disadvantage of disabling a long time use of a curing apparatus and UV irradiation non-uniformity resulting from cooling non-uniformity. For products presented from this technology, the currently developed curing equipment provides high efficiency in a cooling flow design compared to the prior art, and can make cooling constant for a length direction of a long-arc lamp because it is of a structure optimizing a cooling flow rate.

SUMMARY OF THE INVENTION

An aspect of exemplary embodiments of the present invention is to address at least the problems and/or disadvantages and to provide at least the advantages described below.

Accordingly, an aspect of exemplary embodiments of the present invention is to provide a hand carry type portable curing apparatus using a long-arc UV lamp for, by installing a fan in a front surface of a housing of the curing (drying, coating, and printing) apparatus, forcibly sending the external air to the long-arc UV lamp and extending the period of time of use of the apparatus, and making the cooling uniformity of the UV lamp constant and improving UV irradiation uniformity.

Another aspect of exemplary embodiments of the present invention is to provide a hand carry type portable curing apparatus using a long-arc UV lamp for, by installing a fan tilted to the front, increasing a supply amount of the external air supplied to the long-arc UV lamp and enhancing cooling efficiency.

A further aspect of exemplary embodiments of the present invention is to provide a hand carry type portable curing apparatus using a long-arc UV lamp for, by installing a tilting plate and a guide partition within a housing, concentrating the supplied external air on the long-arc UV lamp and enhancing cooling efficiency, and making the cooling uniformity of the UV lamp constant and improving UV irradiation uniformity.

A yet another aspect of exemplary embodiments of the present invention is to provide a hand carry type portable curing apparatus using a long-arc UV lamp for, by coupling a screw bolt to a hinge having screw mountains formed in a handle installed in a top surface of a housing, changing a handle angle by means of screwing of the screw bolt and making a work possible even at a far distance.

According to one aspect of the present invention, a portable ultraviolet (UV) beam generator comprises: a housing extending in a longitudinal direction; an UV lamp having an elongated shape and installed in the longitudinal direction in the housing; a fan installed at a front end opening of the housing for cooling the UV lamp, the fan installed at an angle slanted from 95° to 170° relative to the longitudinal axis of the housing; a tilted plate installed in the housing at a rear side of the fan, the tilted plate inclined at an angle to direct an air flow from the fan in an upwardly inclined direction in the housing; and a guide partition installed in the housing at a rear side of the tilted plate, the guide partition having an open front end to receive the air flow there-through and defining an internal chamber in the housing, the internal chamber extending in the longitudinal direction of the housing and having the UV lamp installed therein, the internal chamber having its internal volume gradually reducing from a front side to a rear side thereof such that the air flow from the fan becomes faster as it approaches from the front side toward the rear side of the internal chamber to effectively cool the UV lamp installed therein.

The portable UV beam generator is preferably further includes a bracket attached at an upper side of the housing, and a handle coupled to the bracket by a hinge such that the handle is rotatable about the hinge to adjust its position relative to the housing.

BRIEF DESCRIPTION OF THE DRAWINGS

The above and other objects, features and advantages of the present invention will become more apparent from the following detailed description when taken in conjunction with the accompanying drawings in which.

DESCRIPTION OF SYMBOLS

Figure 1:
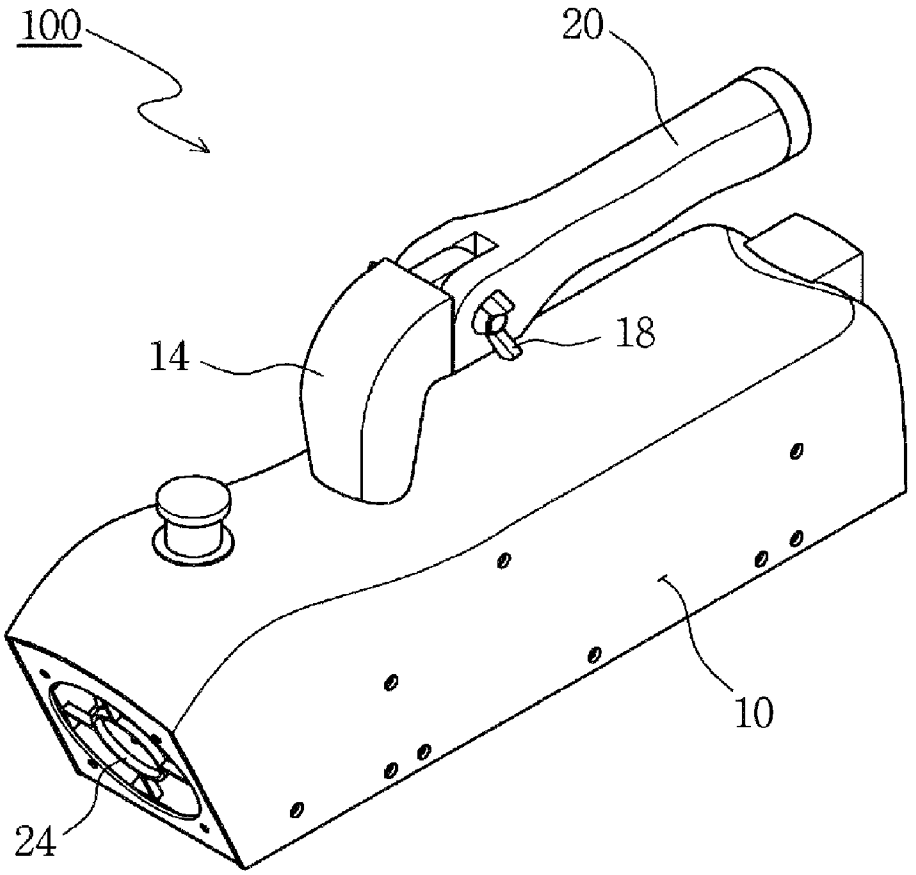
FIG. 1 is a diagram wholly illustrating a construction of a hand carry type portable curing apparatus using a long-arc UV lamp according to the present invention.

| | |
|---|---|
| 10: housing | 12: receiving space |
| 14: bracket | 20: handle |
| 22: cooling means | 24: fan |
| 26: support plate | 28: tilting plate |
| 32: long-arc UV lamp | 34: guide partition |
| 38: chamber | 38a, 38b: 1st and 2nd chambers |

Throughout the drawings, the same drawing reference numerals will be understood to refer to the same elements, features and structures.

DETAILED DESCRIPTION OF THE INVENTION

Exemplary embodiments of the present invention will now be described in detail with reference to the annexed drawings. In the following detailed description, an exemplary embodiment of the present invention will be representatively presented to accomplish the aforementioned technological subject. And, other exemplary embodiments of the present invention are replaced by description in a construction of the present invention.

The present invention is to realize a hand carry type portable curing apparatus using a long-arc UV lamp for concentrating the external air introduced by a fan on the long-arc UV lamp and enhancing cooling efficiency, by installing a guide partition in an accepting part of a housing of a curing system.

On the other hand, in the present invention, a hand carry type portable curing apparatus using a long-arc UV lamp is, for example, described, but it is obvious that the present invention can be applied even to a drying, coating, and printing apparatus according to need.

Figure 2:
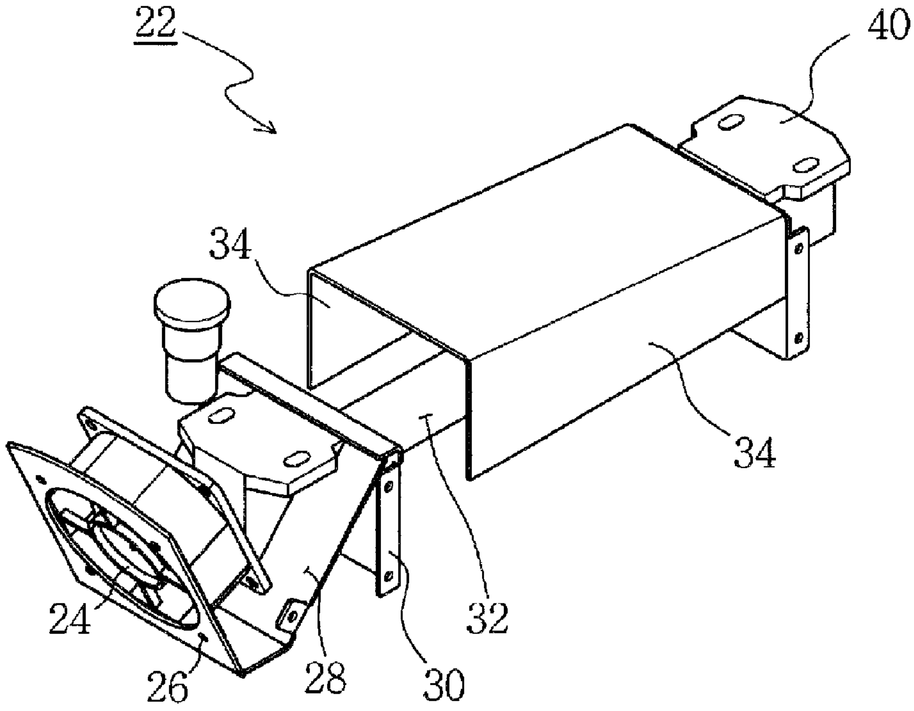
FIG. 2 is a three-dimensional diagram illustrating a structure of a cooling means installed within the hand carry type portable curing apparatus of FIG. 1.
Figure 3:
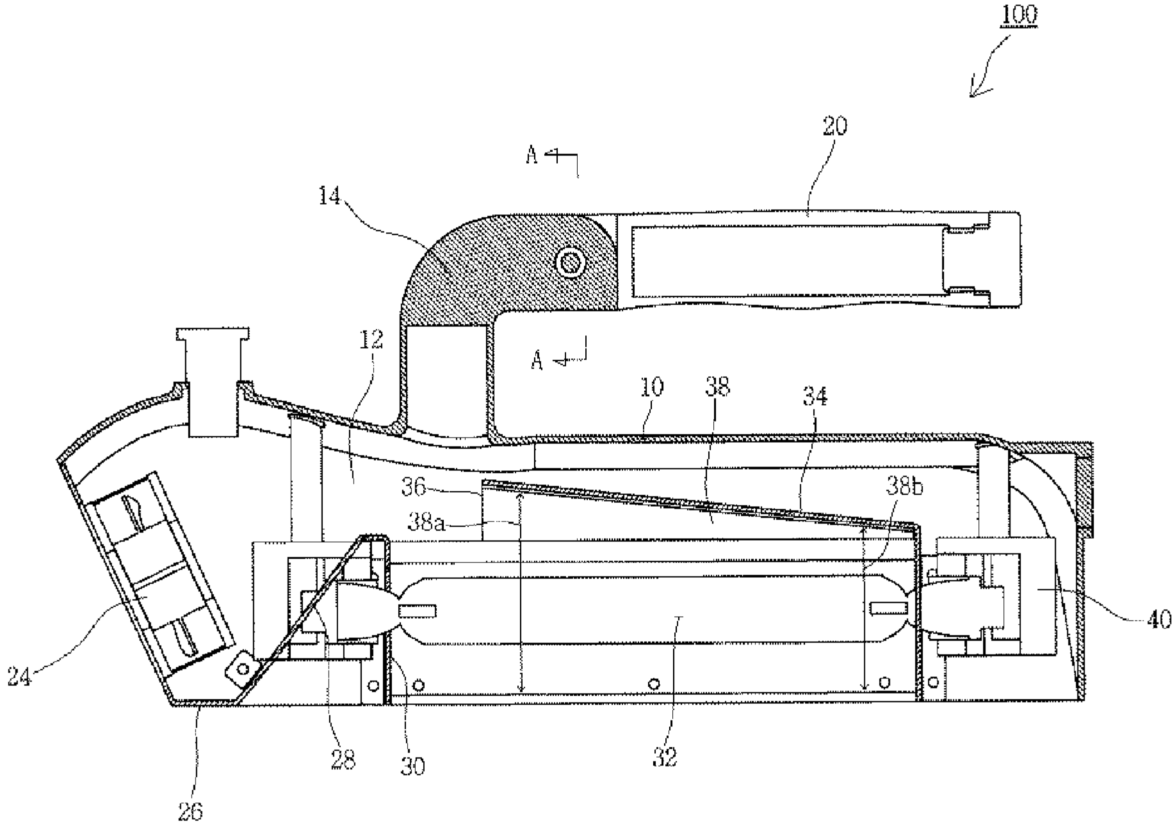
FIG. 3 is a sectional diagram illustrating the hand carry type portable curing apparatus of FIG. 1.
Figure 4:
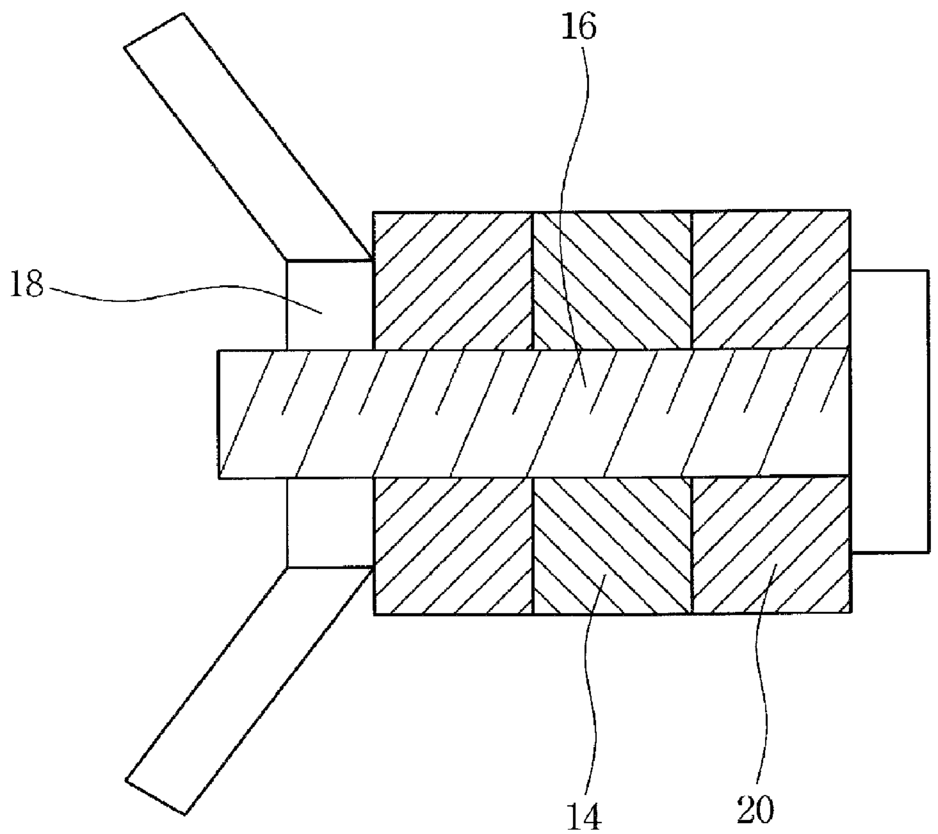
FIG. 4 is a diagram illustrating a section along line A-A of FIG. 3.

FIG. 1 is a diagram wholly illustrating a construction of a hand carry type portable curing apparatus 100 using a long-arc UV lamp according to the present invention. FIG. 2 is a three-dimensional diagram illustrating a structure of a cooling means 22 installed within the curing apparatus 100 of FIG. 2. FIG. 3 is a sectional diagram illustrating the hand carry type portable curing apparatus of FIG. 1. FIG. 4 is a diagram illustrating a section along line A-A of FIG. 3.

As illustrated in FIGS. 1 to 4, the hand carry type portable curing apparatus 100 using the long-arc UV lamp according to the present invention is composed of a cooling means 22 having the long-arc UV lamp 32 installed therein and a housing 10 providing a receiving space 12 for installing the cooling means 22.

The housing 10 has a shape such as a case covering the cooling means. A support plate 26 is installed in a front surface of the housing 10, and installs and fits a fan 24 for forcibly taking the external air. A receiving space 12 is formed inside the housing 10, a bracket 14 is affixed at an upper surface of the housing 10, and a handle 20 is fitted and installed at an end of the bracket 14.

The bracket 14 is provided at an upper end of the housing 10, and the handle 20 is coupled to the bracket 14 by a hinge 16 such that the handle 20 rotates centering on the hinge 16. Also, as in FIG. 4, the hinge 16 is exposed at its end outside the handle 20, and forms screw mountains on its outer diameter. The screw bolt 18 is coupled to the exposed end of the hinge 16 in a screwing scheme, and locks and unlocks the rotation of the handle 20 depending on a screw and unscrew operation of the screw bolt 18 and changes an angle of the handle 20 according to a user's demand.

On the other hand, the cooling means 22 is installed in the accepting part 12 within the housing 12.

The cooling means 22 includes the fan 24 forcibly absorbing the external air, the support plate 26 supporting the fan 24 and having a plate shape, a tilting plate 28 connecting to the support plate 26 and guiding upward the external air that is forcibly absorbed with the fan, a fixing plate 30 fixing the tilting plate 28, the long-arc UV lamp 32 installed in rear of the fixing plate 30, and the guide partition 34 installed at an upper surface of the long-arc UV lamp 32.

As aforementioned, the fan 24 is installed in an opened inlet of the housing 10, and rotates by a power source applied from a power source unit, and forcibly absorbs the external air to the accepting part 12 of the housing 10. At this time, it is desirable that the fan 24 and the support plate 26 supporting the fan 24 are disposed on the slant to tilt at a predetermined angle in one side direction, desirably, in a left direction of the drawings (i.e., to the front of the housing 10). This is to guide the external air to be intensively absorbed upward the accepting part 12 of the housing 10. Particularly, it is most desirable that the tilting angle of the fan 24 is determined within a range of 95° to 170° on the basis of a lamp length direction.

The tilting plate 28 is extension-formed at an end of the support plate 26 supporting the fan 24. At this time, the tilting plate 28 is disposed on the slant to be inclined at a predetermined angle in a direction opposite to the fan 24, i.e., in a right direction of the drawings. Thus, when the external air absorbed to the fan 24 collides with the tilting plate 28, the external air is forcibly guided upward riding a tilting surface of the tilting plate 28, thereby concentrating the external air upward the accepting part 12 of the housing 10 and guiding the external air to be more intensively absorbed inside the guide partition 34.

The fixing plate 30 is extension-formed at an end of the tilting plate 28 in a state that it is vertically erected. One end of the long-arc UV lamp 32 is fixed to the fixing plate 30, and the other end of the long-arc UV lamp 32 is fitted to a holder 40 installed at an end of a space of the accepting part 12 of the housing 10 and fixes the long-arc UV lamp 32 to the accepting part 12 of the housing 10.

The guide partition 34 is of a "∩" shape. The guide partition 34 is constructed to be opened at the front and bottom end and closed at the other end, and is covered with the long-arc UV lamp 32 interposing the chamber 38 therebetween, and guides air such that the external air can be concentrated on the long-arc UV lamp 32 after colliding with the tilting plate 28 and being absorbed upward the accepting part 12 of the housing 10. That is, if air is absorbed upward the accepting part 12 of the housing 10, the absorbed air is introduced into the chamber 38 inside the guide partition 34 through an opening 36 of the front of the guide partition 34, and the introduced external air is discharged to the long-arc UV lamp 32 installed below the guide partition 34 interposing the chamber 38 therebetween and is concentrated on the long-arc UV lamp 32, thus enhancing cooling efficiency.

Particularly, it is desirable to form the internal chamber 38 of the guide partition 34 such that, as it goes from the front to the rear, its internal volume gradually gets narrower, desirably, a volume of a 1st chamber 38*a* of the front of the guide partition 34 increases and a volume of a 2nd chamber 38*b* of the rear of the guide partition 34 relatively decreases. This is to allow the external air to be uniformly discharged to the whole surface of the long-arc UV lamp 32.

That is, by the relationship that the 1st chamber 38*a* is large in volume compared to the 2nd chamber 38*b*, absorbed air is much gathered in the 1st chamber 38*a*, but a speed of air discharged to the long-arc UV lamp 32 beneath is slow. On the other hand, by the relationship that the 2nd chamber 38*b* is small in volume compared to the 1st chamber 38*a*, absorbed air is less gathered in the 2nd chamber 38*b*, but a speed of air discharged the long-arc UV lamp 32 beneath is relatively fast. In result, an amount of air discharged from the 1st and 2nd chambers 38*a* and 38*b* to the long-arc UV lamp 32 is made uniform, thereby uniformly discharging the external air to the whole surface of the long-arc UV lamp 32 and uniformly cooling the whole long-arc UV lamp 32.

Operation of the hand carry type portable curing apparatus 100 using the long-arc UV lamp according to the present invention is described below with reference to the accompanying FIGS. 1 to 3.

First, in a process of using the hand carry type portable curing apparatus 100 using the long-arc UV lamp 32, when it is to cool the long-arc UV lamp 32, if the fan 24 is applied with a power source and is driven, the external air is introduced into the accepting part 12 of the housing 10 through the fan 24. At this time, the introduced external air is intensively absorbed upward the accepting part 12 of the housing 10 through a tilting angle of the fan 24 and the tilting plate 28.

Next, the external air concentrated upward the accepting part 12 of the housing 10 is forcibly introduced into the chamber 38 between the guide partition 34 and the long-arc UV lamp 32 through an opened front surface of the guide partition 34. At this time, a large amount of air is gathered in the 1st chamber 38*a* and is slowly discharged to the long-arc UV lamp 32, and a less amount of air is gathered in the 2nd chamber 38*b* and is faster discharged to the long-arc UV lamp 32. In result, an amount of discharged air is made constant and thus the external air can be uniformly discharged to the whole surface of the long-arc UV lamp 32 and uniformly cool the whole long-arc UV lamp 32, because the 1st chamber 38*a* toward the front of the guide partition 34 has a large volume and the 2nd chamber 38*b* toward the rear of the guide partition 34 has a relatively small volume such that the guide partition 34 gradually gets narrower in its internal volume as it goes to the rear.

Through a hand carry type portable curing apparatus using a long-arc UV lamp, the present invention achieves many effects as follows.

First, the present invention realizes an operation and effect of forcibly sending the external air to a long-arc UV lamp through a fan, thus being capable of extending the period of time of use of the apparatus and in addition, installing the fan on the slant to the front, thus being capable of increasing an amount of supply of the external air supplied to the long-arc UV lamp and enhancing cooling efficiency. Also, the present invention makes the cooling uniformity of a UV lamp constant, thus realizing the improvement of UV irradiation uniformity.

Also, the present invention installs a tilting plate and a guide partition within a housing, thus providing a synergy effect of being capable of concentrating the supplied external air on the long-arc UV lamp and more enhancing cooling efficiency.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A portable ultraviolet (UV) beam generator comprising:

a housing extending in a longitudinal direction;

an UV lamp having an elongated shape and installed in the longitudinal direction in the housing;

a fan installed at a front end opening of the housing for cooling the UV lamp, the fan installed at an angle slanted from 95° to 170° relative to the longitudinal axis of the housing;

a tilted plate installed in the housing at a rear side of the fan, the tilted plate inclined at an angle to direct an air flow from the fan in an upwardly inclined direction in the housing; and a guide partition installed in the housing at a rear side of the tilted plate, the guide partition having an open front end to receive the air flow there-through and defining an internal chamber in the housing, the internal chamber extending in the longitudinal direction of the housing and having the UV lamp installed therein, the internal chamber having its internal volume gradually reducing from a front side to a rear side thereof such that the air flow from the fan becomes faster as it approaches from the front side toward the rear side of the internal chamber to effectively cool the UV lamp installed therein.

2. The portable ultraviolet (UV) beam generator of claim 1, further comprising a bracket attached at an upper side of the housing, and a handle coupled to the bracket by a hinge such that the handle is rotatable about the hinge to adjust its position relative to the housing.

3. The portable ultraviolet (UV) beam generator of claim 2, further comprising a fastener coupled to the hinge to fix the position of the handle relative to the housing.

* * * * *